UNITED STATES PATENT OFFICE.

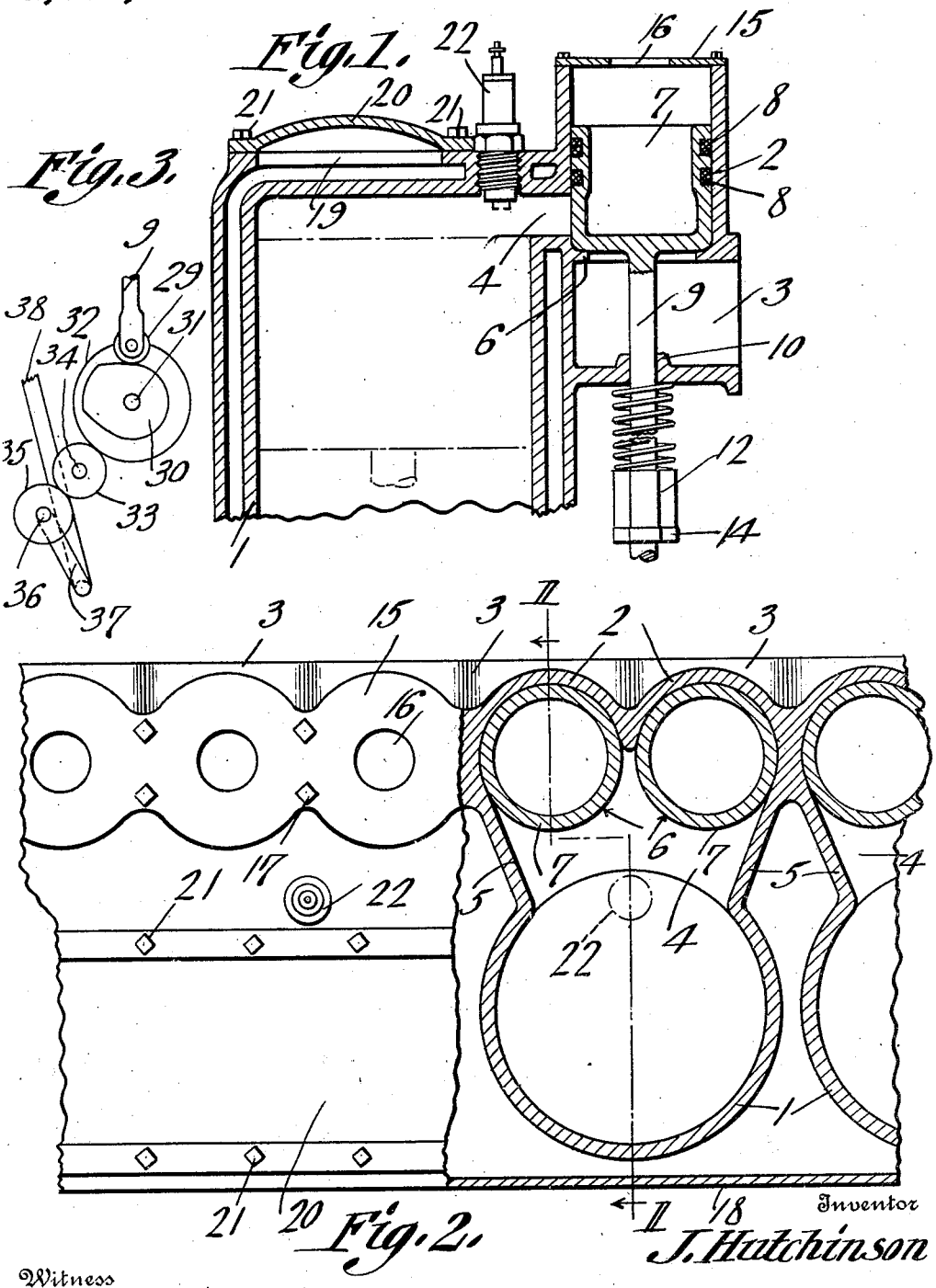

JOHN HUTCHINSON, OF WELLINGTON, KANSAS.

VALVE.

1,250,463.  Specification of Letters Patent.   Patented Dec. 18, 1917.

Application filed June 6, 1917. Serial No. 173,183.

*To all whom it may concern:*

Be it known that I, JOHN HUTCHINSON, a citizen of the United States, residing at Wellington, in the county of Sumner and State of Kansas, have invented a new and useful Valve, of which the following is a specification.

The device forming the subject matter of this application is an internal combustion engine, and the invention aims primarily to improve the valve construction of the engine, so that the valves may operate without back pressure.

The invention aims, further, to improve structurally, an internal combustion engine of the type hereinafter described, in details which will be made manifest as this specification proceeds.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 is a sectional view showing a portion of an internal combustion engine embodying the present invention;

Fig. 2 is a top plan of the engine, parts being broken away, the line 1—1 in Fig. 2 indicating the cutting plane on which Fig. 1 is taken.

Fig. 3 is a diagrammatic view showing one means for operating the valve.

The engine forming the subject matter of this application includes any desired number of cylinders 1. Formed integrally with the cylinders 1 at the upper ends thereof and at one side of the cylinders are valve casings 2, there being two valve casings for each cylinder 1. Formed integrally with the cylinders 1 and with the valve casings 2 and located below the valve casings 2 are tubular members 3. A port 4 forms a communication between the bore of each cylinder 1 and the valve casings 2 of each cylinder, the port 4 being defined by diverging walls 5 connecting the cylinder proper 1 with the casings 2 in a manner which will be understood clearly from Fig. 2. In the upper portion of the tubular member 3 of each cylinder 1 is fashioned a pair of seats 6, individual to the casings 2, the seats 6 being depressed below the lower wall of the port 4, as clearly shown in Fig. 1, so that the valves hereinafter described may coöperate with the seats 6 properly to prevent leakage.

Mounted for right line sliding movement in the casings 2 are valves 7 provided with packing rings 8 coöperating with the bores on the casings 2. Each valve 7 includes a stem 9 passing through the tubular member 3, there being bosses 10 on the lower wall of each tubular member 3, in which the stems of the valves are slidably received. Compression springs 11 surround portions of the stems 9, the upper ends of the springs 11 abutting against the tubular member 3, and the lower ends of the springs 11 being engaged by adjusting nuts 12 threaded onto the stems 9, the adjusting nuts being held in position by means of lock nuts 14. The function of the springs 11 is to maintain the valves 7 engaged with the seats 6, and an adjustment of the springs may be effected by rotating the nuts 12 and 14, in a manner which will be understood clearly by those skilled in the art. A cover 15 fits upon the upper ends of the valve casings 2 of the engine and is held in place by securing elements 17, the cover 15 having openings 16 individual to the valve casings 2. The cylinders 1 of the engine are provided with a jacket 18, in the top portion of which there are openings 19 individual to the cylinders 1, the openings 19 being closed by a detachable cover 20 held to the top portion of the jacket by means of securing elements 21. A spark plug 22 or like ignition device passes through the top portion of the jacket and through the upper head of the cylinder 1 and is located closely adjacent to the inner end of the port 4.

The construction of the device is such, owing to the presence of the openings 16 in the covers 15, that there will be practically no back pressure on the valves 7, one valve of each cylinder being an intake valve, and the other valve being an exhaust valve. The valves 7 may be ground readily and the construction is such that an adequate port opening is provided for the intake and for the exhaust. It is to be observed that when the valve 7 is engaged with the seat 6, the packing rings 8 lie above the upper wall of the port 4, and consequently, the packing rings are never caught, distorted or broken, by reason of the fact that they are never compelled to travel across the port 4. The cylinders of the engine are adequately jacketed and cooled, owing to the specific jacket construction shown and described.

As shown in Fig. 3, the stem 9 carries a roller 29 coöperating with a cam 30 on a shaft 31 carrying a gear wheel 32 meshing into a pinion 33 on a shaft 34, the pinion 33 meshing into the pinion 35 on an engine shaft 36 carrying a crank 37 with which the pitman 38 is assembled. It will now be obvious that the valves 7 are actuated by a gear train including the cams 30, the gear wheels 32, the pinions 33 and the pinions 35. The cam 30 may be so made as to hold the valve 7 open any desired length of time, simply by altering the extent of the high point of the cam.

Having thus described the invention, what is claimed is:—

In an internal combustion engine, a one piece structure comprising parallel valve casings and lateral tubular members the upper portions of which form the bottoms of the casings, the said bottoms being provided with openings establishing communication between the casings and the respective tubular members, the casings comprising diverging walls forming a single port which opens into both casings; cup-shaped valves mounted for right line sliding movement in the casings and controlling the said openings, the valves having stems slidably received in the lower portions of the lateral tubular members; spring means assembled with the exposed portions of the stems for holding the valves seated; a one piece closure for the ends of both casings, the said closure having reduced openings individual to the casings and of smaller diameter than the internal diameter of the valves; and means for holding the closure on the casings.

In testimony that I claim the foregoing as my own, I have hereto affixed my signature in the presence of two witnesses.

JOHN HUTCHINSON.

Witnesses:
R. H. Dowler,
W. H. Ellyson.